United States Patent [19]
Jensen

[11] Patent Number: 5,332,369
[45] Date of Patent: Jul. 26, 1994

[54] PUMP UNIT WITH COOLING JACKET FOR ELECTRIC MOTOR

[75] Inventor: Niels D. Jensen, Bjerringbro, Denmark

[73] Assignee: Grundfos A/S, Bjerringbro, Denmark

[21] Appl. No.: 904,786

[22] Filed: Jun. 26, 1992

[30] Foreign Application Priority Data

Jun. 28, 1991 [DE] Fed. Rep. of Germany ....... 4121430

[51] Int. Cl.$^5$ ............................................. F04B 17/00
[52] U.S. Cl. ................................... 417/369; 417/423.8
[58] Field of Search .............. 417/366, 369, 371, 372, 417/423.8

[56] References Cited

U.S. PATENT DOCUMENTS

| | | |
|---|---|---|
| 2,784,672 | 3/1957 | Wallace ................... 103/87 |
| 4,213,745 | 7/1980 | Roberts ................... 417/369 |
| 4,465,437 | 8/1984 | Jensen et al. ........... 417/366 |
| 4,726,746 | 2/1988 | Takada et al. .......... 417/366 |
| 4,834,624 | 5/1989 | Jensen et al. ........... 417/423.8 |
| 4,854,829 | 8/1989 | Stanzani et al. ........ 417/369 |
| 4,998,865 | 3/1991 | Nakanishi et al. ...... 417/366 |

FOREIGN PATENT DOCUMENTS

| | | |
|---|---|---|
| 1808856 | 5/1973 | Fed. Rep. of Germany . |
| 2743112 | 4/1979 | Fed. Rep. of Germany . |
| 3642727 | 6/1988 | Fed. Rep. of Germany . |
| 3738592 | 5/1989 | Fed. Rep. of Germany . |
| 3820005 | 10/1989 | Fed. Rep. of Germany . |

Primary Examiner—Richard A. Bertsch
Assistant Examiner—Alfred Basichas
Attorney, Agent, or Firm—Panitch Schwarze Jacobs & Nadel

[57] ABSTRACT

A pump unit especially for heat producing and heat distributing plant has an electric motor having a rotor which is sealed against the fluid conveyed by the pump unit. The electric motor which is cooled by the conveyed fluid drives a rotary pump for controlling the speed of the unit. Part of the stream of the conveyed fluid which is diverted for cooling the electric motor and the frequency converter, flows through a cooling jacket which receives the motor. The frequency converter is attached to the outside of the cooling jacket in heat conducting relationship therewith and the frequency converter and the motor are received in a common housing.

10 Claims, 2 Drawing Sheets

PUMP UNIT WITH COOLING JACKET FOR ELECTRIC MOTOR

FIELD OF THE INVENTION

This invention relates to a pump unit, especially for heat producing and heat distribution plant, comprising an electric motor, cooled by fluid conveyed by the pump unit, the motor having a rotor sealed against said fluid; a rotary pump driven by the electric motor; and a frequency converter for controlling the speed of the unit, wherein the conveyed fluid which is diverted for cooling the motor flows through a cooling jacket circumferentially surrounding the motor.

BACKGROUND OF THE INVENTION

The general laws governing rotary pumps suggest that the stream of fluid conveyed by the pump increases in proportion to the speed of the pump, the conveying rate increases by the square of the speed and the pump output increases by the cube of the speed. These laws accordingly suggest that rotary pumps should be driven at high speeds. Since a pump unit can be driven at different speeds, a whole range of different speeds can be achieved with one unit without constructional modification thereof. Thus by appropriate choice and control of the speed of the pump, a pump unit can be run for optimum economy.

Control of the speed of a pump unit of the type described above is achieved by means of the frequency converter.

By virtue of developments in the field of electronics frequency converters can now be made of such small size as to be capable of integration into a pump unit of the type concerned. Such a pump unit having an integrated frequency converter is described, for example, in German Patent Application No. 36 42 727, which discloses an underwater motor pump having a built-in frequency converter. The motor of the pump is a wet rotor motor, that is to say the rotor runs in a can flushed through by the conveyed fluid. The conveyed fluid flowing through the can is used for cooling both the motor and the frequency converter. A disadvantage of such wet rotor motors resides however in huge frictional losses by the rotor running within the fluid-filled can. The efficiency of the unit is, therefore, drastically reduced, especially at higher speeds.

In pump units, for example, in swimming pool technology, the rotor of the electric motor is sealed from the conveyed fluid and thus suffers considerably less frictional losses than a wet rotor. In this case the motor is cooled by means of a cooling jacket on the outer circumference of the motor stator, through which jacket part of the stream of the conveyed fluid passes. A motor for such a pump unit is disclosed for example in German Patent No. 37 38 592. When such a motor is controlled by a frequency converter, the frequency converter must regularly be cooled. Since for air cooling a frequency converter, a large convection cooler is needed, the size of the pump unit is substantially increased. Although for liquid cooling, no large cooling means are needed, the cooling liquid, as a rule the conveyed liquid, must be supplied by way of pipes to the frequency converter and removed therefrom, which is uneconomical.

SUMMARY OF THE INVENTION

An object of the invention is to provide a pump unit of the type concerned in which the disadvantages discussed above are avoided, the pump unit being of small size and of simple construction and the heat losses of the electric unit being transferred almost exclusively to the conveyed fluid stream.

According to the present invention, therefore, the frequency converter is connected to the outside of the cooling jacket in heat conducting relationship therewith and together with the motor is arranged in a common housing.

The advantages described above of a pump unit having a wet rotor motor and those of a pump unit having a dry rotor motor, which motors are preferably driven at high speeds, are thereby combined. A pump unit according to the present invention has a comparatively higher degree of efficiency, as compared with known pump units and is more energy efficient. A pump unit according to the present invention is very compact whilst the cost of manufacturing the pump unit is desirably low. A further increase in efficiency is achieved if the pump unit is used in a heat producing and heat distribution plant, since almost the entire heat losses from the electric motor and the frequency converter are supplied to the conveyed medium, that is to say heat energy is obtained from the heat losses of the motor and the frequency converter.

When such a pump unit is used in a heat production and distribution plant the dominant factor is not the normal hydraulic efficiency factor $\eta$, but the thermodynamic efficiency factor $\eta_t$. The hydraulic efficiency factor $\eta$ is the ratio of conveyed output and electric output.

$$\eta = \frac{P_Q}{P_{el}} = \frac{Q \cdot H \cdot e \cdot g}{P_{el}}$$

Where Q is the conveyed stream, H is the conveying rate, e is the density of conveyed medium, and g is the acceleration due to gravity.

The thermodynamic efficiency factor $\eta_t$ is as follows:

$$\eta_t = \frac{P_Q}{P_{el}} + \frac{P_{el} - P_Q}{P_{el}} \cdot \frac{a}{b}$$

The efficiency factor ($\eta_t$) includes in the equation also the losses $P_{el} - P_Q$ and evaluates these with the energy production costs of the energy units. The factor a represents the production costs of an energy unit comprised of combustible materials, the factor b represents the production costs of the same energy unit comprised of electric current. Since the factor b, which contains the heat energy production over the electric current, is always greater than the factor a, the ratio comprised of a and b will always be smaller than one. Accordingly $\eta_t$ greater than $\eta$. In a pump unit for a heating plant, the pump unit for a medical bath, a whirlpool pump unit and the like, the thermodynamic efficiency factor of the pump unit can thus be substantially increased by virtue of the invention.

Even in other pump applications where the heating of the conveyed medium by the electric heat losses of the motor and the frequency converter is not advantageous, the pump unit is nevertheless smaller and, therefore, more cost effective, the frictional losses of a wet rotor motor are avoided and the pump can be operated at high speeds.

From the point of view of finish, the cooling jacket is preferably made from deep drawn and welded together nickel-chromium steel sheet.

In the interest of good heat transfer between motor and cooling jacket, the cooling jacket preferably has a cylindrical interior wall receiving the laminated core of the motor stator. The laminated core is pressed into said cylindrical inner wall not only for good heat transfer but also to provide a secure mechanical connection.

For good heat transfer to the cooling jacket for the heat losses produced by the components of the frequency converter, the frequency converter is preferably connected to the cooling jacket by way of a heat distributor. The heat distributor is preferably locked about the outer circumference of the cooling jacket. The frequency converter may thus be constructed as a single component with the heat distributor, which component can be readily attached to the cooling jacket during the assembly of the pump unit.

The pump-side end of the cooling jacket may be provided with a flange by means of which the cooling jacket can be clamped between the motor housing and the pump housing. The cooling jacket can thus be very simply and stably attached within the motor housing.

The motor housing preferably consists of a cap-shaped part and a flange-like part. The cap-shaped part is connected to one end face of the flange-like part and the pump housing is connected to the other end face of the flange-like part. The cooling jacket is then clamped between the flange-like part and the pump housing. The cap-shaped part of the motor housing can, therefore, be removed whereby the frequency converter is made accessible without further dismantling of the pump unit.

Preferably, inlet and outlet openings for the conveyed fluid passing through the cooling jacket are provided on the front side of the cooling jacket facing the pump. The conveyed fluid may then follow a helical flow path through the cooling jacket. The conveyed fluid is thus afforded sufficient delay time within he cooling jacket to reduce the quantity of fluid passing through the cooling jacket, thereby reducing the hydraulic power loss. Also sealing problems or fluid-carrying connections in the region of the motor or the motor housing are, thereby avoided. Said helical flow path of the conveyed fluid through the cooling jacket ensures the rapid and reliable removal of any gas that may be trapped in the cooling jacket and which could interfere with its cooling function.

A temperature measuring device may be provided for monitoring said cooling function. A safety circuit associated with the temperature measuring device may be provided to prevent the pump unit from overheating. The temperature measuring device, may have a measuring probe disposed on the outside of the cooling jacket or the heat distributor. The measuring device detects excessive heating of the frequency converter as a result of electrical overloading, for example, by reason of a defective component, and also detects any stoppage in the flow of the cooling fluid through the cooling jacket.

DETAILED DESCRIPTION OF THE PREFERRED EMBODIMENT OF THE INVENTION

Figure 1:
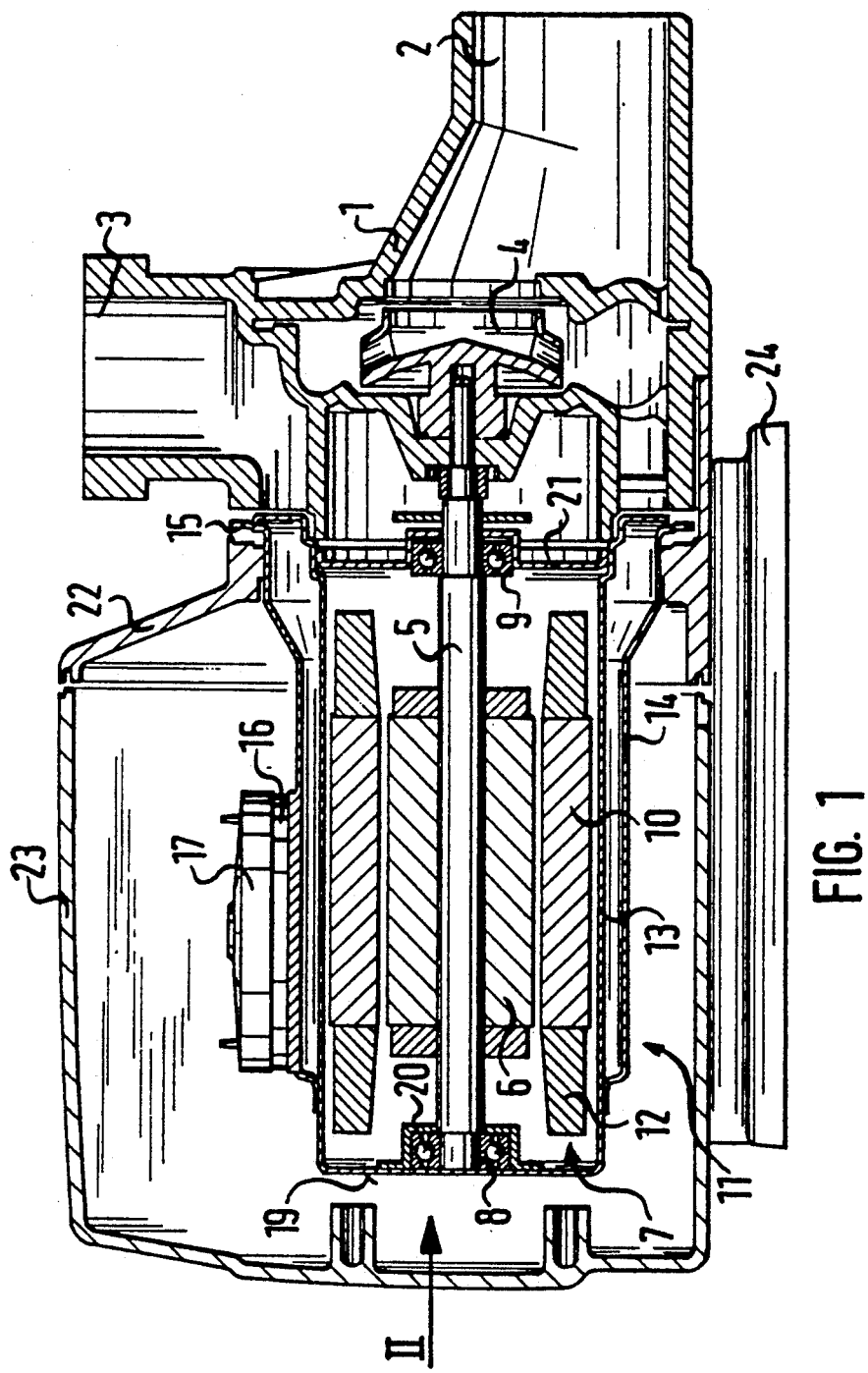
FIG. 1 a greatly simplified longitudinal section through a pump unit according to the preferred embodiment of the invention.

The pump unit is a whirlpool pump. The pump has a housing 1 with an inlet pipe 2 and an outlet pipe 3. Between the inlet and outlet pipes 2 and 3 is a pump element in the form of a wheel 4 which is rotatable to produce a stream of fluid to be conveyed by the pump.

The rotary wheel 4 is seated within the pump housing 1 on one end of a shaft 5 which carries the rotor 6 of an electric motor 7. The shaft 5 is sealed with respect to the pump housing 1 and is mounted in a bearing 8 on the side of the motor remote from the wheel 4 and in a bearing 9 proximate to the wheel 4.

The rotor 6 of the electric motor 7 is thus also mounted by way of the bearings 8 and 9 and rotates within a stator 10 whose cylindrical outer circumference of laminated cores lies within a cooling jacket 11. The stator 10 has a stator winding 12.

The cooling jacket 11 consists of a cylindrical, cup-shaped part 13 having an open end portion constructed as a stepped flange. The cup-shaped part 13 is circumferentially surrounded by an annular part 14 widening towards the open end of the cup-shaped part 13 to provide a flange 15. The flanges of the parts 13 and 14 are tightly connected together to form a common flange, preferably by welding.

The parts 13 and 14 of the cooling jacket 11 cooperate to define therebetween an annular chamber having two diametrically disposed openings 25 to the pump housing 1. Each of said openings 25 provides a connection for the stream of fluid conveyed by the pump. The said openings 25 are located in respective areas of different pump pressure, so that during a pumping operation part of said stream passes through the cooling jacket 11 to act as a stream of cooling fluid. The parts 13 and 14 are made of deep drawn nickel-chromium steel plate and are welded together.

Figure 2:
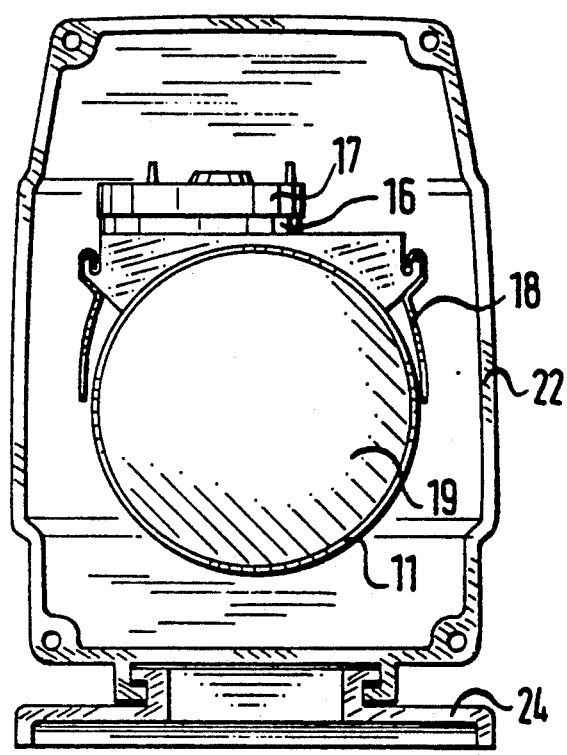
FIG. 2 a view taken in the direction of the arrow II in FIG. 1.

A frequency converter 17 for controlling the speed of the motor 7 is connected to the cylindrical exterior of the annular part 14 of the cooling jacket 11 by way of a heat distributor 16, in heat conducting relationship with the jacket 11. To this end the frequency converter 17 with its heat loss producing electronic components is arranged and constructed in known manner in such a way that the lost heat is conducted by way of the heat distributor 16 to the cooling jacket 11. Heat distributor 16 and the frequency converter 17 are constructed as a modular unit which is locked to the outer circumference of the cooling jacket 11. This may be achieved for example by means of leaf springs, referenced 18 in FIG. 2, which are dimensioned to embrace the underside of the cooling jacket 11 or are welded to its sides. These leaf springs 18 engage behind corresponding projections on the longitudinal sides of the heat distributor 16 and urge it towards the cooling jacket 11.

On the inside surface of the base 19 of the cup-shaped part 13 of the jacket 11 is a receptacle 20 for the bearing 8. There is inserted within the cup-shaped part 13 near the open end of the cooling jacket 11 a sheet metal, annular receptacle 21 for the bearing 9. The receptacle 21 is essentially disc-shaped and has a circumferential collar for connection to the cup-shaped part 13, as well as a central moulding for receiving the bearing 9. The receptacle 21 has a central perforation for receiving the shaft 5.

As will be appreciated from the foregoing, the motor 7 is received within the cooling jacket 11, the frequency converter 17 being seated on the outside of the jacket 11. Towards the pump wheel 4, the cooling jacket 11 is supported by an inner part of the pump housing 1, as shown in FIG. 1. The cooling jacket 11 as well as the unit 16,17 supported thereby are supported by the flange 15 of the jacket 11, which is clamped between the pump housing 1 and a flange-like housing part 22. The housing part 22 has a tubular part receiving and guiding the flange 15. There is connected to said tubular part, in the direction of the motor 7, a diagonally widened flange part for connection to the front side of a housing cap 23 for sealing the housing towards the rear.

The cap 23 is approximately cup-shaped, as shown in FIG. 1, and encases, in spaced relationship therewith, substantially the entire cooling jacket 11 as well as the heat distributor 16 and frequency converter 17 mounted thereon.

On the underside of the motor housing 22,23 is a base 24 which is displaceable in the axial direction of the pump unit.

Within the heat distributor 16 is a temperature measuring device 26 (shown in phantom) for monitoring the cooling effect of the fluid. The temperature measuring device may alternatively be mounted on the outside of the cooling jacket 11.

What is claimed is:

1. A pump unit, comprising:
   a rotary pump for producing a stream of fluid to be conveyed by the pump unit;
   an electric motor having a rotor drivingly connected to the rotary pump and being sealed against ingress of said fluid;
   a cooling jacket circumferentially surrounding the electric motor for receiving fluid diverted from said fluid stream as cooling fluid;
   a frequency converter for controlling the speed of the electric motor and being connected to an exterior portion of the cooling jacket in heat conducting relationship therewith; and
   a common motor housing receiving the frequency converter and the electric motor.

2. A pump unit as claimed in claim 1, wherein the cooling jacket is made of deep drawn nickel-chromium steel plate, and includes a flange opening fusing the rotary pump.

3. A pump unit as claimed in claim 1, wherein the cooling jacket defines a cylindrical annular chamber, the electric motor having a stator having a laminated core resting against said jacket.

4. A pump unit as claimed in claim 1, comprising a heat distributor connecting heat loss producing components of the frequency converter to the cooling jacket in heat conducting relationship therewith.

5. A pump unit as claimed in claim 4, wherein the heat distributor is locked about an outer circumference of the cooling jacket.

6. A pump unit as claimed in claim 1, wherein a flange at one end of the cooling jacket is clamped between a housing and a housing for the motor of the rotary pump.

7. A pump unit as claimed in claim 1, wherein the motor housing has a flange-like part having a front face connecting the cooling jacket with a housing of the rotary pump.

8. A pump unit as claimed in claim 1, wherein the cooling jacket has a front face facing the rotary pump, having at least one inlet and one outlet for said cooling fluid.

9. A pump unit as claimed in claim 1, wherein a temperature measuring device is disposed on an exterior portion of the cooling jacket for monitoring a cooling effect of the cooling fluid.

10. A pump unit as claimed in claim 4, wherein a temperature measuring device is disposed on the heat distributor for monitoring a cooling effect of the cooling fluid.

* * * * *